United States Patent [19]

Jenkins

[11] Patent Number: 4,496,430
[45] Date of Patent: Jan. 29, 1985

[54] MASS TRANSFER APPARATUS

[75] Inventor: Arthur E. O. Jenkins, Porthcawl, Wales

[73] Assignee: Distillation Technology Limited, England

[21] Appl. No.: 338,541

[22] Filed: Jan. 11, 1982

[30] Foreign Application Priority Data

Jan. 22, 1981 [GB] United Kingdom ............... 8101937
May 18, 1981 [GB] United Kingdom ............... 8105192

[51] Int. Cl.³ .............................................. B01D 3/26
[52] U.S. Cl. .................................... 202/158; 196/111; 203/98; 261/114 R; 261/114 TC
[58] Field of Search ............... 202/158, 159, 154, 183, 202/184; 203/98, 99, 75, 100, DIG. 19, 42; 261/114 R, 114 TC; 196/100, 111

[56] References Cited

U.S. PATENT DOCUMENTS

| 4,028,191 | 6/1977 | Scott | 202/158 |
| 4,361,469 | 11/1982 | Trutna | 202/158 |

FOREIGN PATENT DOCUMENTS

| 634806 | 9/1936 | Fed. Rep. of Germany. |
| 667636 | 11/1938 | Fed. Rep. of Germany. |
| 1281398 | 2/1965 | Fed. Rep. of Germany. |
| 2552357 | 11/1975 | Fed. Rep. of Germany. |
| 2835462 | 12/1978 | Fed. Rep. of Germany. |
| 2190510 | 1/1974 | France. |
| 141374 | 7/1921 | United Kingdom. |
| 237617 | 10/1926 | United Kingdom. |
| 569039 | 5/1945 | United Kingdom. |
| 719197 | 11/1954 | United Kingdom ............ 261/114 R |
| 972015 | 10/1964 | United Kingdom. |
| 1506393 | 4/1978 | United Kingdom ............... 202/158 |

Primary Examiner—Wilbur Bascomb
Attorney, Agent, or Firm—Arnold, White & Durkee

[57] ABSTRACT

Mass transfer apparatus such as a distillation or rectification column which is divided so that the vapor flow is in two streams each in a separate zone, and wherein in each zone the liquid/vapor contacting stages have an inlet and an outlet disposed on opposite sides of an active area but to the same side of the division and such that liquid flow from the inlet across the active area to the outlet is generally rectilinear and parallel to the plane of the division, the locations of the stages in one zone being staggered axially relative to those of the stages in the other zone along the column and the liquid from each outlet being directed to an inlet of the next lower stage in the column whereby the liquid flow down the column is directed alternately from one zone to the other as it is passed successively from stage to stage down the column. This arrangement increases the number of theoretical liquid/vapor contacting stages that can be provided in a column of given length and maximizes mass transfer point efficiency enhancement with an uncomplicated design which permits ready modification of existing columns.

8 Claims, 16 Drawing Figures

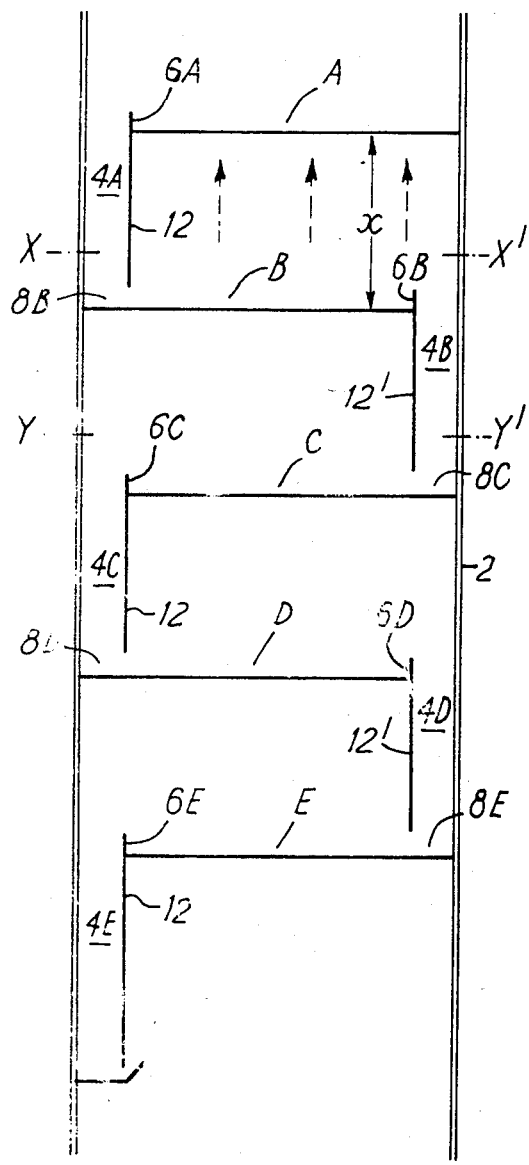
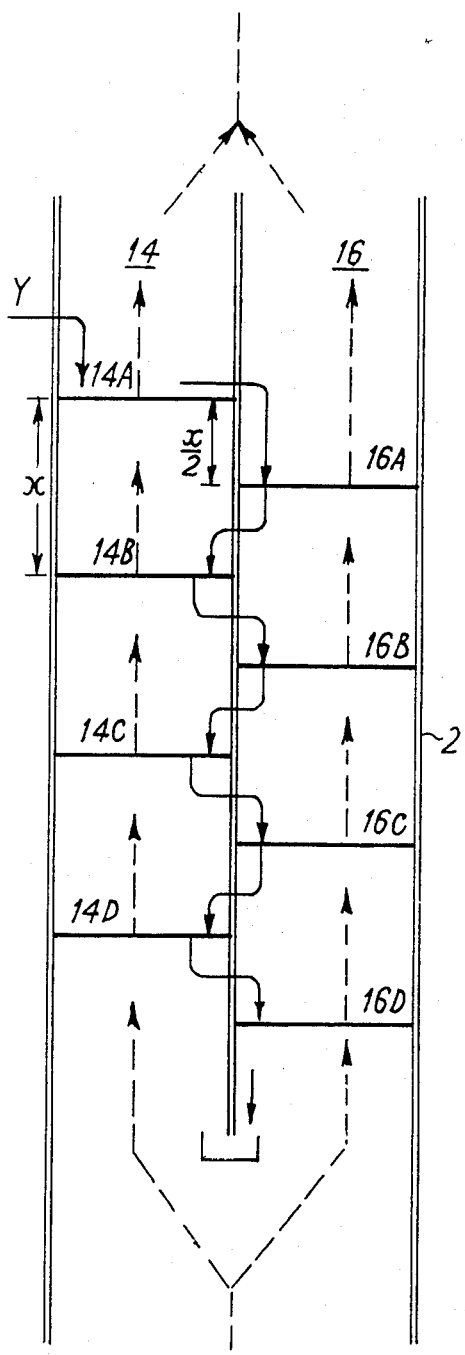
FIG. 1
PRIOR ART
FIG. 4

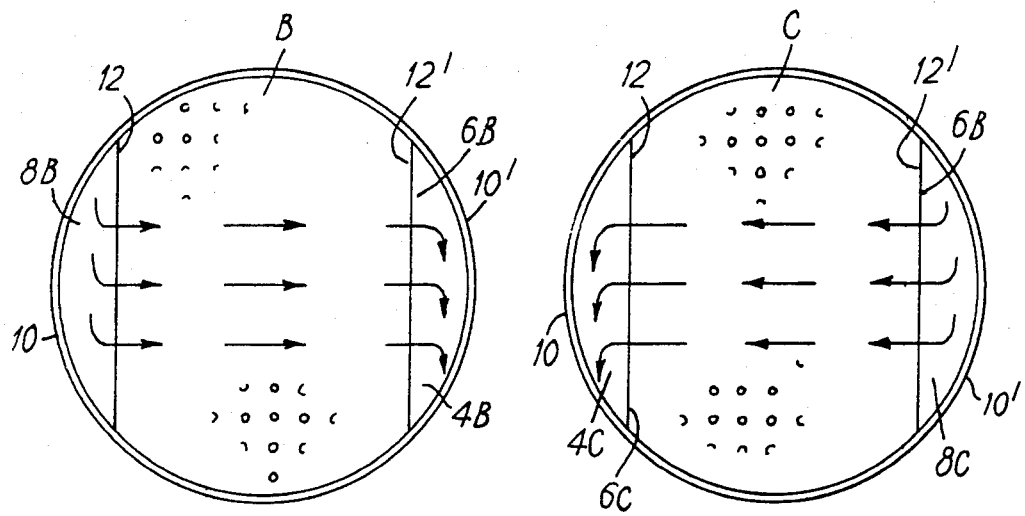
*FIG. 2*
PRIOR ART
*FIG. 3*
PRIOR ART
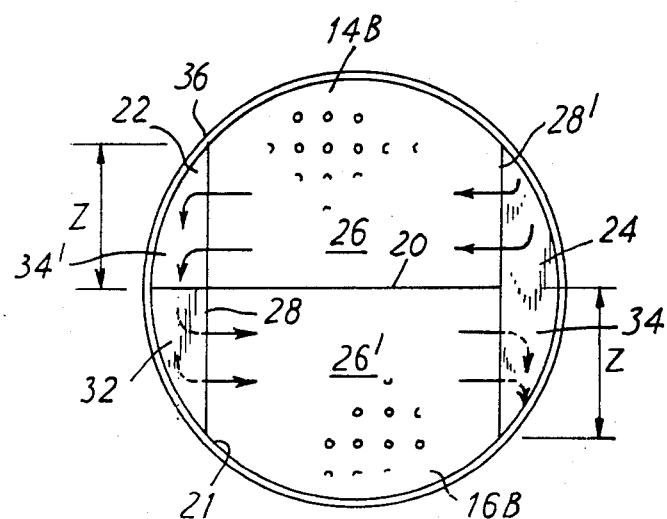
*FIG. 6*

MASS TRANSFER APPARATUS

This invention relates to a mass transfer apparatus, e.g. distillation column or absorption column, of the kind having a plurality of liquid/vapour contacting stages spaced apart one above the other in a tower or column. Each stage has an active area where intimate contact is effected between a rising vapour stream and a liquid stream flowing over the stage as it travels from stage to stage down the column, whereby to effect exchange of components between the liquid and vapour streams.

It has been proposed to divide the column into two or more vertical zones so that the vapour flow up the column is divided into at least two separate streams, and to divide the liquid/vapour contacting stages, e.g. bubble cap trays, into segments, one for each of the vertical zones, the segments being offset vertically relative to each other and the arrangement being such that the liquid stream descending the column is passed downwards in a stepwise manner from segment to segment and travels through each zone in sequence as it flows down the column. In such an arrangement having n zones, the descending liquid stream is subjected to n times as many contacting stages as each of the n vapour streams ascending the column and thus can make n times as many contacts with different vapour compositions as is the case in a column of conventional design with the same axial spacing between liquid/vapour contacting stages as between adjacent stages in one of the zones of the apparatus. Such a construction therefore permits a significant increase in the number of theoretical liquid/vapour contacting stages with a column of given length.

It has also been recognised that as the downflowing liquid stream flows across each tray there may be a tendency for the ratio of high boiling components to low boiling components in its composition to increase, and, if so, improved mass transfer point efficiency enhancement is favoured if the liquid is caused to flow in the same direction across each tray so that the trend of enrichment of high boiling components in the liquid is in the same direction across each tray.

However, the specific arrangements of mass transfer apparatus that have been proposed hitherto to achieve these effects have suffered from one or more of the following defects.

The relative locations of inlet and outlet for each tray have been such as to provide a "short circuit" in the liquid flow across the tray and thus cause substantial under-utilisation of the available tray.

The liquid flow pattern causes variation in the degree of submergence over the area of each tray thereby reducing mass transfer point efficiency.

The liquid flow pattern causes different flow path lengths and hence liquid residence times and/or induces substantial back- or side-mixing on each tray thereby reducing or negating any potential benefits of having the liquid pass in the same direction across each tray because of the concentration gradient effect.

The arrangement requires the liquid leaving one tray to be transferred from one side of the column to the other to be fed to the inlet to the next tray, thus necessitating the provision of transverse pipes with concomitant complication of column design, increase of expense and limitation in the size of the outlet which in turn severely limits the liquid load that can be carried by the column.

The width of the outlet from each tray is limited to not more than one half of the diameter of the column, thereby severely limiting the maximum liquid load relative to vapour that can be handled by the column.

The present invention provides a design of mass transfer apparatus of the kind having two vertical zones and offset of the liquid/vapour contacting stages in one zone relative to the other, but in which the above-mentioned disadvantages are reduced or avoided.

According to the present invention, there is provided mass transfer apparatus including a generally vertical columnar section having an axially extending divider which divides the section into two parallel zones so that vapour flow up the section is in two separate streams; each zone having a plurality of liquid/vapour contacting stages located at axially spaced intervals therealong, each stage having disposed to one side of an active area thereof an inlet for the supply of liquid to said area and on the opposite side of that area an outlet for draining liquid from said area, said inlet and outlet being disposed to the same side of the divider as the liquid/vapour contacting stage and such that liquid flow from the inlet across the active area to the outlet is generally rectilinear and parallel to the divider, the locations of the stages in one zone being staggered axially relative to those of the stages in the other zone along the columnar section; and each outlet being connected by a downcomer for liquid flow therethrough to an inlet of the next lower stage in the section whereby the liquid flow down the section is directed alternatively from one zone to the other as it is passed successively from stage to stage down the section.

The invention also provides an assemblage of parts including liquid/vapour contacting stages and/or sections thereof, said assemblage being adapted for assembly within a hollow vertical columnar casing to form said mass transfer apparatus.

In the apparatus of the invention, the descending liquid stream is subjected to twice as many vapour-liquid contacting stages as each of the two vapour streams ascending the column and thus can make twice as many contacts with different vapour compositions as would be the case in a column of conventional design with the same axial spacing between stages as between the stages in either zone of the apparatus of the invention. Accordingly, an increase in the number of effective equilibrium mass-transfer stages in a given length of column is achieved and thereby an enhanced degree of separation for the same energy consumption. Alternatively, the same degree of separation as a conventional column can be achieved with the expenditure of less energy. Conversely, for the same energy consumption, the same degree of fractionation can be achieved with a lesser number of actual liquid/vapour contacting stages, thus reducing the capital cost of the column and internals.

Further, in each zone of the apparatus of the invention, the downflowing liquid flows in the same direction across each active area in all the liquid/vapour contacting stages in that zone. Thus the trend of enrichment of higher boiling components in the liquid is in the same direction across each stage in the zone, thus providing the ideal arrangement for mass transfer point efficiency enhancement by concentration gradient.

Arranging for the inlet and outlet areas associated with an active area of each liquid/vapour contacting stage to be disposed on opposite sides of the active area such that the liquid flow across the active area is generally rectilinear suppresses tendencies for side- or back-mixing, thereby improving the mass transfer point efficiency enhancement relative to overall efficiency that is achievable from causing the liquid to flow in the same direction across each liquid/vapour contacting stage in a zone of the column.

This arrangement also permits the inlet and outlet to extend in a direction generally transverse, e.g. generally normal, to the plane of the divider. In one convenient embodiment, each liquid/vapour contacting stage is in effect divided into an inlet area, active area and outlet area by notional dividing lines each extending at an angle, and preferably normal, to the plane of the divider.

By an inlet area we mean an area of the stage which receives liquid from a preceding stage for delivery through the inlet to an active area, and by an outlet area, we mean an area into which liquid from an active area drains from an outlet. In general, an inlet area will correspond to that area of a stage which is under a downcomer and an outlet area will correspond to or define the mouth of a downcomer, and the inlet and outlet will, in this embodiment, lie generally in the plane dividing the inlet area and outlet area, respectively, from the active area.

In the above embodiment, where each stage has a single active area the maximum inlet or outlet width that is practicable is about 40% of the column diameter and thus it is most suitable for cases where the vapour load is expected to be substantially the dominant load. However the arrangement also permits the ready division of each liquid/vapour contacting stage into a plurality of active areas each lying between an inlet area which receives liquid draining from an active area of the preceding stage in the section and an outlet for draining liquid from an active area beside it. By means of such division, the effective total inlet and outlet width of each stage can be substantially increased, e.g. up to as much as 1.8 times the column diameter, thereby providing the capability for coping with higher liquid/vapour load ratios.

Where a liquid/vapour contacting stage has two or more active areas each lying between an inlet area and an outlet area, the effective length of the outermost inlet and/or outlet, which will be located at the position having the smallest chordal length of all the inlets and outlets of that stage, may be increased, if desired, by making it curved, e.g. to run parallel to the wall of the column or angled e.g. cranked or double-cranked.

The locations, across the width of the divider, of the active areas of the stages in one zone can correspond with those of the stages in the other zone and the dispositions of the inlet and outlet areas of the stages in one zone can correspond with those of the outlet and inlet areas, respectively, of the stages in the other zone, and causing liquid flow across each active area of each liquid/vapour contacting stage in each of the zones to be in the same direction as across each of the corresponding active areas above and below it, without the need to provide transversely directed transfer pipes.

One preferred arrangement providing a plurality of active areas on each stage, and permitting this preferred disposition of active areas, inlet areas and outlet areas in each zone, is for each stage to have $2n$ active areas, $p$ inlet areas and $q$ outlet areas, where $n$ is a positive integer and where in one of the zone $p=n$ and $q=n+1$ and in the other of the zones $p=n+1$ and $q=n$, with each liquid/vapour contacting stage being, in effect, divided into said active areas, inlet areas and outlet areas by notional dividing lines extending in a direction generally normal to the plane of said vertically extending division.

In general, $n$ will be 1 or 2. Where $n$ is 1, so that each liquid/vapour contacting stage has two active areas, one of the zone includes stages having an inlet area, an active area disposed to each side of said inlet area and an outlet area disposed to the other side of each active area from the inlet area, and the other of the zones includes stages having an outlet area, an active area disposed to each side of said outlet area and an inlet area disposed to the other side of each active area from the outlet area.

In the above arrangement, each stage will have an even number of active areas. However, it is also possible for each stage to have an odd number of active areas and still obtain the above-mentioned preferred disposition of active areas, inlet areas and outlet areas.

An important practical aspect of the present invention is that its arrangement is such that the internal constructions of existing single- and multi-pass mass transfer apparatus can readily be modified to be in accordance therewith.

It will be understood that for most applications the divider will be located generally diametrically so as to divide the section into two zones of equal or substantially equal areas. It will also be usual for the liquid/vapour contacting stages in each of the zones to be spaced at generally equal axial intervals along the zone and for the axial locations of the stages in one zone to be staggered by a distance $(x/2)$ relative to the axial locations of the stages in the other zone, where $x$ is the distance between adjacent stages in one of the zones.

The active areas of the liquid/vapour contacting stages may be formed in conventional fashion, e.g. using sieve tray-, valve tray- and bubble cap tray-sections.

The internal constructions of the apparatus according to the invention may be formed from a plurality of individual plates and other components. The plates and other components may be sized so as to be capable of being introduced into preformed columns or towers through existing ports or manholes and may be designed to be fixed together within the tower or column in conventional manner, e.g. using nuts and bolts, and attached to the column wall using conventional or existing fixing means, e.g. bolting bars and peripheral rings, thereby facilitating the ready modification of existing mass transfer apparatus to operate according to the invention.

The invention is now described in greater detail with reference to the accompanying drawings wherein FIG. 1 is a vertical cross-sectional view in diagrammatic form through part of the length of a single pass mass transfer column of conventional design, e.g. a distillation column, omitting the reboil, reflux and feed sections, and showing a few liquid/vapour contacting stages or trays;

FIGS. 2 and 3 are cross-sectional plan views of the apparatus of FIG. 1 at XX' and YY', respectively;

FIG. 4 illustrates the principle of operation of a single-pass mass transfer apparatus of FIGS. 1, 2 and 3 when modified according to the present invention, and viewed at right angles to the view of the conventional column shown in FIG. 1;

FIG. 6 is a cross-sectional plan view of the arrangement of FIG. 5, located in a column;

Figure 9:
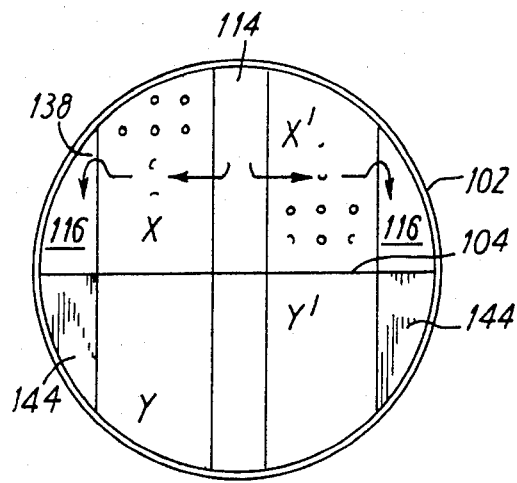
FIGS. 9 and 10 are cross-sectional plan representations of the column of FIGS. 7 and 8 at AA' and BB', respectively, of FIG. 7.
Figure 10:
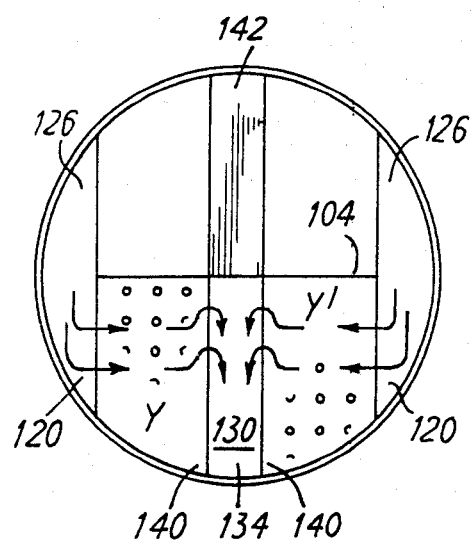
Figure 15:
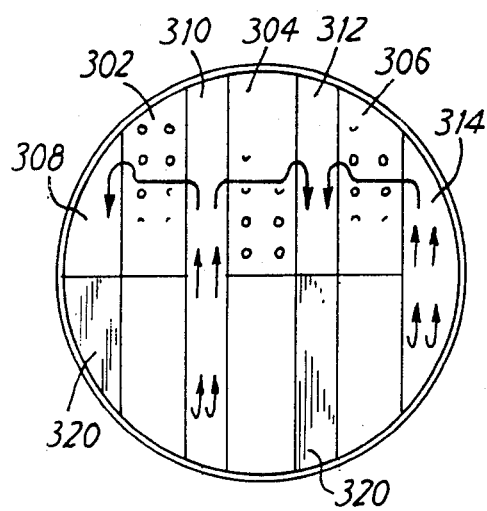
Figure 16:
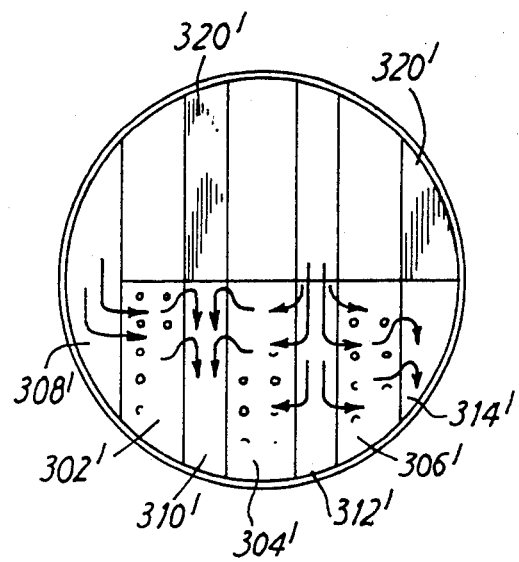
Figure 13:
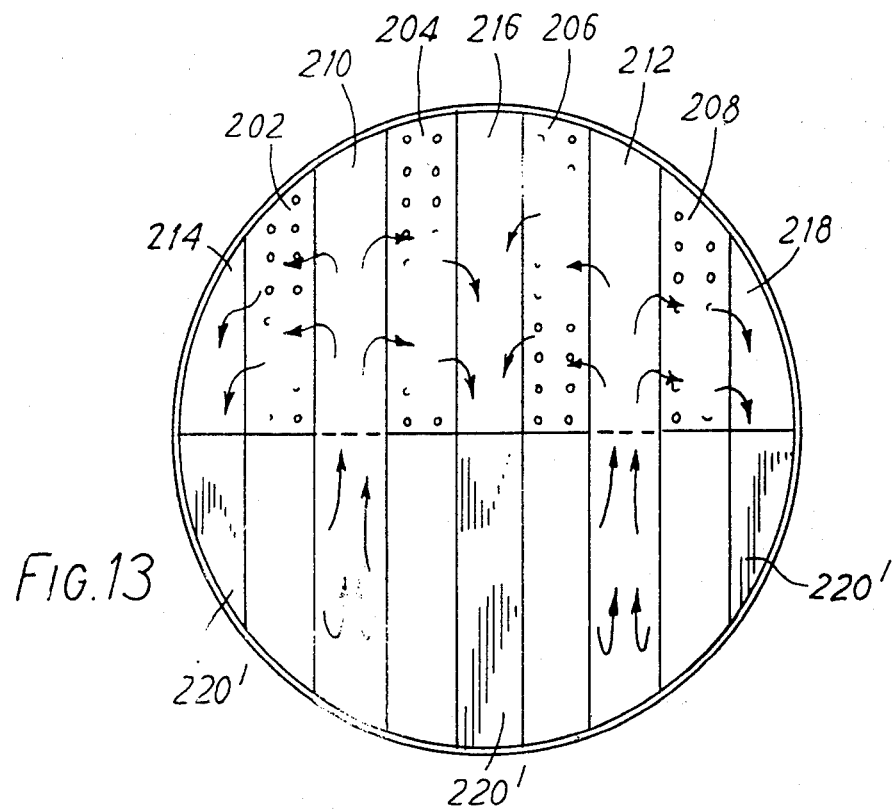
Figure 14:
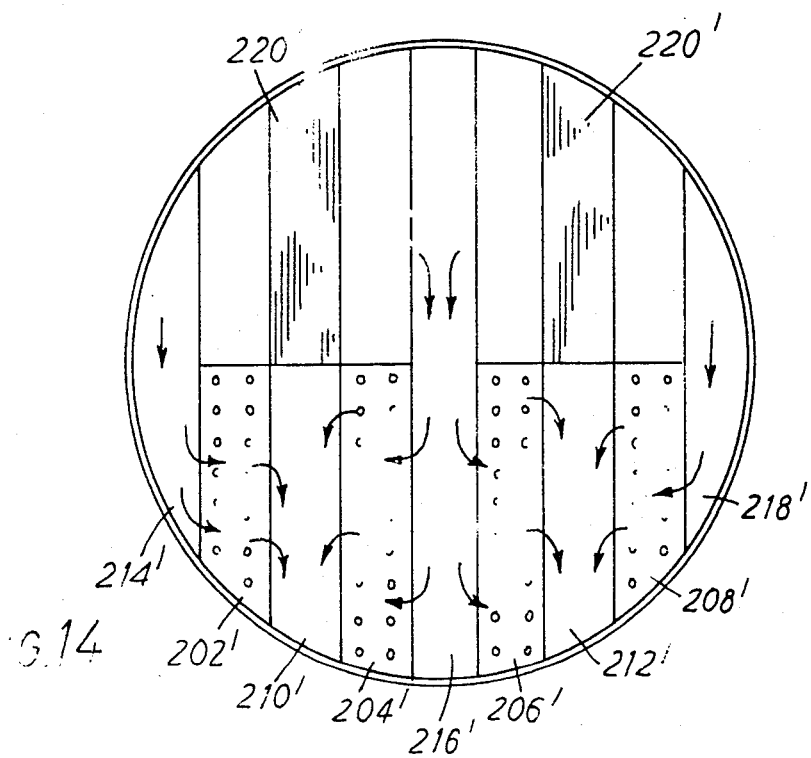

FIGS. 13 and 14 are cross-sectional plan representations taken at levels corresponding to those of FIGS. 9 and 10 of a column according to the invention which is in effect a modified four-pass column; and FIGS. 15 and 16 are cross-sectional plan representations, taken at levels corresponding to those of FIGS. 9 and 10, of a column according to the invention which is in effect a modified three-pass column.

A conventional single pass mass transfer, e.g. distillation, column such as illustrated in FIGS. 1, 2 and 3 includes a plurality of liquid/vapour contacting stages, A, B, C, D, E, etc, located within a generally vertical casing 2. The liquid/vapour contacting stages may take the form of sieve trays, valve trays, bubble cap trays or any other known form of construction permitting rising vapour to pass through and intimately contact liquid over the active area of each stage. Associated with each stage is a downcomer 4A, 4B, etc, the arrangement being such that liquid supplied to each tray flows across the active area of the tray to drain (e.g. over an outlet weir such as 6A, 6B, etc) into a downcomer by means of which it is supplied to the inlet area 8B, 8C, etc to the next tray below in the column across the active area of which it flows to the weir and downcomer associated with the next tray, and so on in a zig-zag fashion down the tower while the vapour passes up the tower through the active area of each tray in well known fashion. As seen best in FIGS. 2 and 3, the downcomer for liquid flowing from alternate trays A, C, E, etc is generally a vertical channel whose cross section is defined by an arc 10 of the column and a chord 12 bisecting the arc and the inlet area for those trays is of corresponding cross-section but in a diametrically opposed location, bounded by arc 10' and chord 12', and the locations of the downcomer and inlet area for the trays B, D, etc are reversed whereby the downcomer from one plate supplies the inlet area to the next.

The separation that can be achieved by the column depends inter alia on the reflux ratio employed and the number of contacting stages (or trays) provided in the column and of course increasing the possible separation by increasing the number of trays generally increases the height of the column. If the trays are located too close to each other then depending on the liquid/vapour ratio in the distillation zone there is a tendency for downcomer flooding to occur or for liquid entrained in vapour passing through one tray being carried up into contact with the liquid in the next higher tray (so-called "entrainment flooding"), thus interfering with the separation effect.

Referring to FIG. 4 of the drawings, in its simplest form the apparatus of the present invention may be regarded, in effect, as a modification of the conventional single pass mass transfer apparatus illustrated in FIGS. 1, 2 and 3. The column 2 is divided into two axially extending parallel zones 14, 16 by a diametric divider plate 18 which extends axially in a vertical plane which is generally normal to the chords 10, 12, 10', 12', and bisects the vertical planes in which said chords lie. Thus each liquid/vapour contacting stage A, B, C, etc is, in effect, divided into two halves 14A and 16A, 14B and 16B, 14C and 16C etc, with one half in each of the zones. The axial locations of the two halves of each stage are staggered with respect to each other and in the embodiment illustrated the spacing between the two halves, which is the preferred spacing for optimum operation, is (x/2) where x is the axial distance between adjacent trays in the conventional arrangement illustrated in FIGS. 1, 2 and 3.

As illustrated by the solid flow lines in FIG. 4, the internal arrangement of the column is so designed and constructed that the liquid draining from each half tray is directed through the divider 18 to the next lower half tray which is in the other zone of the column. Thus, the liquid is directed from one zone to the other as it flows from half-tray to half-tray down the column. The vapour flow up the column illustrated by the broken lines is divided into two separate streams by the divider. Thus, the liquid flowing down the column contacts each vapour stream alternately and the descending liquid stream is subjected to twice as many vapour-liquid contacting stages as the vapour ascending the column.

In the disposition of the column as illustrated in FIG. 4, the flow of the liquid across each tray is in a direction normal to the plane of the drawing and is reversed as it flows from one zone to the other. Thus, for example, for half trays 14A, 14B, etc, the flow may be towards the viewer out of the plane of the drawing and for the other half trays, 16A, 16B, etc, it will be away from the viewer, into the plane of the drawing.

Figure 5:
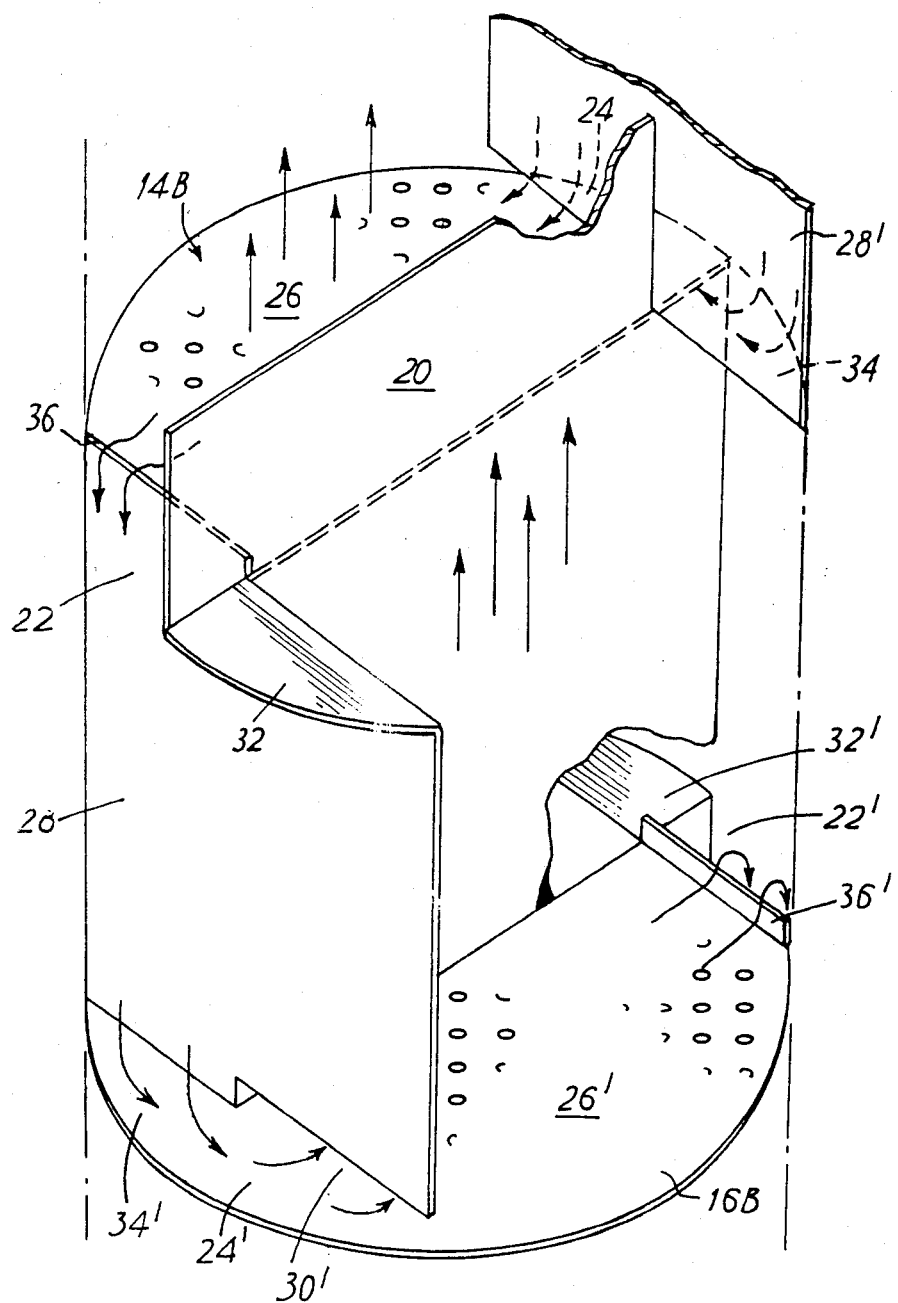
FIG. 5 is an isometric view showing one internal construction arrangement for a mass transfer column operating in accordance with the principle illustrated in FIG. 4.

One suitable internal arrangement for a column operating in accordance with the principle illustrated in FIG. 4 is illustrated in FIGS. 5 and 6 of the drawings.

Referring to FIG. 5, which is an isometric, part cutaway view of the arrangement showing two liquid/vapour contacting stages only, the divider is provided by a generally diametrically disposed axially extending baffle plate 20 and each of the two zones 14, 16 is provided with a plurality of half trays spaced vertically one above the other, two of which, 14B and 16B, one in each zone, are illustrated. Each half tray is generally semicircular in plan but with one extremity, comprising a segmental portion lying between the inner wall 21 (FIG. 6) of the column and a vertical plane extending normally from the plane of the baffle plate 20 and located towards one end of the baffle plate, cut away to provide the outlet area connecting to a downcomer. The other extremity, comprising a segmental portion lying between the wall 21 of the column and a second vertical plane extending normally from the plane of the baffle plate 20 and located towards the opposite end of the baffle plate to that of said first vertical plane, forms the inlet area to the half tray. The remaining, central, portion is available to form the active area of the half tray.

For the half trays in zone 14, i.e. tray 14B in the drawing, the inlet and outlet areas are identified as 24 and 22, respectively and for half trays in zone 16, i.e.

tray 16B in the drawing, the corresponding features are identified as 24' and 22', respectively. (FIG. 5) The respective active areas are identified as 26 and 26'. The inlet and outlet areas for the half trays in one zone are located at opposite ends of the dividing plate to those in the other zone.

Liquid entering each outlet area 22 is passed to the inlet area 24' of the next lower half tray in the column by a downcomer and likewise for each outlet area 24 and inlet area 22'. The downcomer from each outlet area 22 comprises a vertical channel lying between the inner wall 21 of the column and a vertical plate 28 which extends between the half tray in zone 14, e.g. 14B, and the next lower half tray in zone 16 in the column, e.g. 16B, in the vertical plane defining the lip (outlet) of the outlet area 22 and across the full width of the column in that plane.

So that the downcomer may feed to the inlet area 24' of the next lower half tray down the column, a gap is provided at the bottom of that half of the plate 28 which extends into zone 16, to provide a mouth (inlet) 30' and the end portion of the baffle plate 20 extending outwardly from plate 28 is omitted.

To prevent vapour from zone 16 entering zone 14, a head plate 32 seals the top of the downcomer space between plate 28 and the inner wall of the column in zone 16 and the bottom of the downcomer space in zone 14 is sealed by an extension 34' of plate 24'.

To provide a downcomer to supply liquid entering each outlet area 22' to the inlet area 24 of the next lower half tray a corresponding plate 28' is provided which extends between each half tray in zone 16 (e.g. 16A, not shown) and the next lower half tray in zone 14, e.g. 14B, the plate having a gap to provide mouth (inlet) 30'. The downcomer has a head plate 32' corresponding to plate 32 and the bottom of the downcomer space in zone 16 is sealed by an extension 34 of plate 24, corresponding to 34' of plate 24'.

Although only two half plates and associated baffle and downcomer arrangements are shown, it will be understood that the arrangement illustrated may be repeated one or more times along the length of the column.

The depth of fluid on each half tray is controlled by a weir 36, 36' and to prevent vapour travelling up the downcomers, the height of the weir should be such that the inlet 30, 30' of each tray is submerged.

In operation, liquid provided to an inlet area 24 passes through mouth (inlet) 30, travels across the active area 26 of a tray 14A, 14B etc in zone 14 of the column and passes into outlet area 22 from which area it is directed through the downcomer to the mouth (inlet) 30' of the inlet area 24' to an active area 26' of the next lower half plate in the column in zone 16 and flows across that active area to the outlet area 22' whence it is directed by the next downcomer to the inlet area 24 of the next lower half tray in the column in zone 14, and so on down the column. Thus, as the liquid flow travels down the column it swaps from zone to zone as it travels from half-tray to half-tray.

Vapour released from the liquid travels up the column in two separate streams, one in zone 14 and the other in zone 16. Thus, vapour flowing upwardly in zone 14 contacts only trays 14A, 14B etc, but in reverse order, and vapour flowing upwardly in zone 16 contacts only trays 16A, 16B, etc, but in reverse order. On the other hand, the downward flowing liquid is in contact alternately with vapour in zone 14 and then vapour in zone 16 as it passes from tray 14A to tray 16A to tray 14B to tray 16B and so on down the column.

It will thus be seen that by means of the arrangement according to the invention, whereas the vapour stream rising up each of the zones 14 and 16 will make the same number of contacts with the downflowing liquid as in a column of conventional design with the same axial spacing between trays, the liquid will make twice as many contacts with different vapour compositions than would be the case in a column of conventional design with the same axial tray spacing. Also, whereas in the conventional column illustrated in FIGS. 1, 2 and 3, the liquid on any tray is contacted by vapour from the next lower liquid/vapour contacting stage in the column, in the arrangement according to the invention the liquid on that tray is contacted by vapour from the next-but-one lower vapour/liquid contacting stage in the column. Thus, the invention provides an increase in the number of effective equilibrium mass-transfer stages within a given length of column and thereby an enhanced degree of separation achievable for the same energy consumption. Alternatively the same degree of separation as in a similarly sized conventional mass-transfer column can be achieved at the expenditure of less energy since a smaller reflux ratio, and hence a smaller amount of reboil, will be required. Additionally, for vapour-liquid ratios for which this arrangement is most suitable, namely where the vapour load tends to predominate, it is possible to handle greater loads within a given diameter column than in the case of a conventional column.

A further advantage of a mass transfer column having the arrangement of the present invention is that, especially for distillations wherein the vapour/liquid ratio is high, its ultimate load handling capacity for a given efficiency is greater than that achievable in a conventional column such as illustrated in FIGS. 1, 2 and 3. The arrangement is particularly suitable for handling high vapour/liquid ratios because the effective tray spacing in respect of entrainment flood, where liquid on one tray is carried by the vapour stream up to contact in the next tray above it in the column, is double the effective tray spacing in respect of liquid downcomer flood.

It will also be seen that in the apparatus according to the invention the liquid flow across all the half trays in a zone is always in the same direction, thereby providing a greater enhancement of mass transfer point efficiency to overall efficiency as compared with a conventional column where the liquid flow down the column is reversed from tray to tray. This is because as the liquid flows across each tray in a mass transfer apparatus, there is a general trend of enrichment in higher boiling components in the liquid. In the arrangement of the present invention, the vapour rising in each zone from the enriched liquid in one tray contacts the enriched liquid in the next tray above in that zone and the vapour rising from the lean liquid contacts the lean liquid in the next tray above whereas in a conventional column the vapour rising from the enriched liquid contacts the lean liquid in the next tray above and the vapour rising from the lean liquid contacts the enriched liquid in the next tray above.

As the liquid descends from half tray to half tray, its direction of travel is reversed and the flow is generally back-and-forth, or zig-zag. This promotes uniformity of liquid distribution over the active area 26, 26' of each half tray, as compared with an arrangement where the liquid flow is more generally arcuate, and reduces any tendency to variation of degree of submergence over the active area due to swirling. The former improves effective utilisation of the active area of the half tray and thus further enhances mass transfer efficiency and the latter improves point efficiency.

On each half tray, the liquid flow from inlet to outlet is generally rectilinear, thereby suggesting tendencies to back- and side-mixing and accordingly maximising the mass transfer effficiency enhancement obtainable by achieving liquid flow in the same direction on all half-trays in each zone of the column. The flow paths across each half tray are also all of substantially equal path length, thereby ensuring uniform residence times and there is no possibility of a shortcircuit of the liquid flow.

The same liquid flow direction across each half tray in each zone is also achieved without the need to provide a transversely mounted transfer pipe to direct the liquid from one side of the column to the other between trays.

In the arrangement of FIGS. 5 and 6, the effective width Z (FIG. 6) of the outlet or weir 36, 36' associated with each tray is limited. The effective width can only be increased by reducing the active area of the half tray. However, if each liquid/vapour contacting stage has a plurality of active areas a substantial increase in effective outlet or weir width can be obtained without sacrificing any of the other advantages of the invention.

One form of construction for such an arrangement, which is in effect a modification of a conventional two pass system, is illustrated in FIGS. 7 to 10 in which reference numeral 102 represents the wall of the column and reference numeral 104 is an axially extending diametrically disposed plate which in effect divides the tray section of the column into two liquid/vapour contacting zones 106, 108 each of which is provided with a series of trays 110A, 110B, 110C etc, and 112A, 112B, 112C etc, respectively, of which only three are shown for convenience. As in the arrangement illustrated in FIGS. 5 and 6, the axial locations of the half-trays in zone 106 are staggered with respect to those of the half-trays in zone 108 whereby the axial distance between adjacent half trays in the column is x/2 where x is the axial distance between adjacent half trays in either of the zones 106, 108 of the column.

In this embodiment, each half tray comprises two active, or liquid/vapour contacting areas formed in effect from a semicircle from which has been omitted (a) a central portion (at the widest part of the semicircle) defined as lying between two major chords extending parallel to each other and at right angles to the plate 104 and from the plate 104 to the circumference of the semicircle and (b) two end portions each comprising the portion of the semicircle lying outside a further minor chord extending at right angles from the plate 104 to the circumference. Thus, the two active, or liquid/vapour contacting areas of each half tray comprise to truncated quadrant sections identified as X and X' for half trays in zone 106 and as Y and Y' for half trays in zone 108.

For the half trays 110A, 110B, etc in zone 106, the said central portion forms the base plate 114 of a downcomer through which liquid is supplied to the tray and comprises an inlet area for supplying liquid to the active areas X and X'. The two end portions form the outlet areas 116 for each of the contacting areas and each connects with a downcomer for liquid draining from the half tray.

For the half trays 112A, 112B, etc in zone 109, the said central portion is absent, providing a gap 118 for liquid draining from the half tray and comprises a common outlet area for the two liquid/vapour contacting areas Y and Y', and each of the two outer portions forms a base plate 120 of a downcomer through which liquid is supplied to the half tray and comprises an inlet area for supplying liquid to the areas Y and Y'.

Thus, the half trays 110A, 110B, etc in zone 106 are supplied with liquid to a centrally disposed inlet area and the liquid divides into two streams which flow outwardly over the liquid/vapour contacting areas X, X' to drain into downcomers from outlet areas disposed at the two extremities of the half tray, and the half trays 112A, 112B, etc in zone 108 are each supplied with liquid from two inlet areas supplied from these second-mentioned downcomers and the liquid from each said inlet areas flows inwardly over a liquid/vapour contacting area Y or Y' to drain from a a centrally located outlet area which supplies the liquid via a downcomer to the centrally disposed inlet area of the next half tray down in zone 106, and so on.

In the embodiment illustrated, the downcomers collecting liquid from half trays in zone 106 and delivering it to half trays in zone 108 are formed by providing a pair of chordal plates 122, extending vertically between alternate pairs of half trays in the column; i.e., for example 110A and 112A, 110B and 112B (as shown) etc, the plates extending fully across the chordal width of the column; i.e. extending from both sides of the main column dividing plate 104. The inactive half at the top of these downcomers is sealed by a head plate 144 (see below).

At the level of the half tray 112 next below, a horizontal slit 124 is formed at the bottom end of each plate, on the other side of the plane of the main column dividing plate 104 from the outlet area 116, to provide the inlet to the half tray 112 and the space between the chordal plate and the wall of the column on the other side of the plane of the plate 104 at the level of the half tray 112 is sealed off by horizontal base plate 126.

Figure 7:
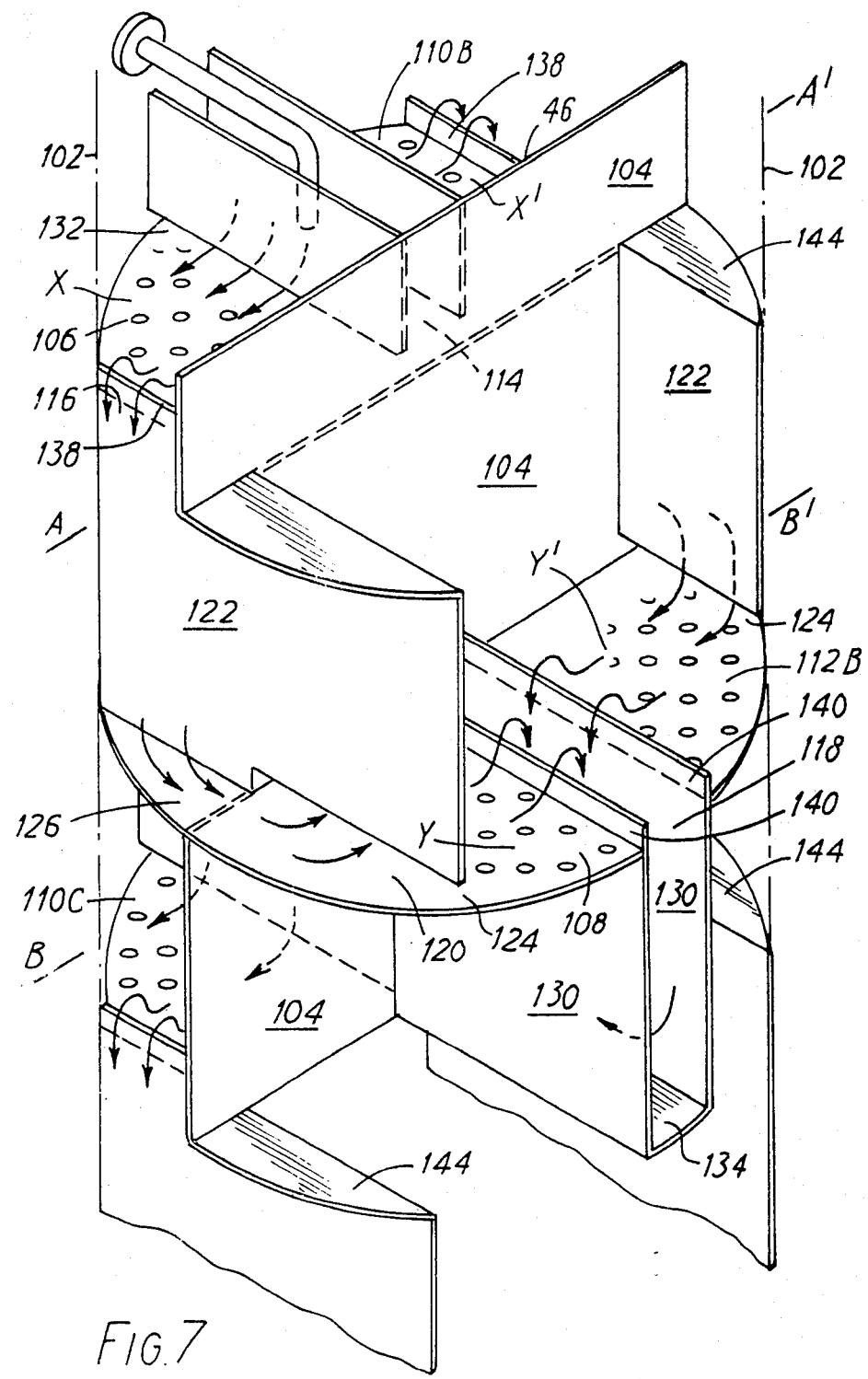
FIG. 7 is a part isometric cutaway view showing the internal construction of part of a column in accordance with another embodiment of the invention, and which is, in effect, a modified two-pass column.
Figure 8:
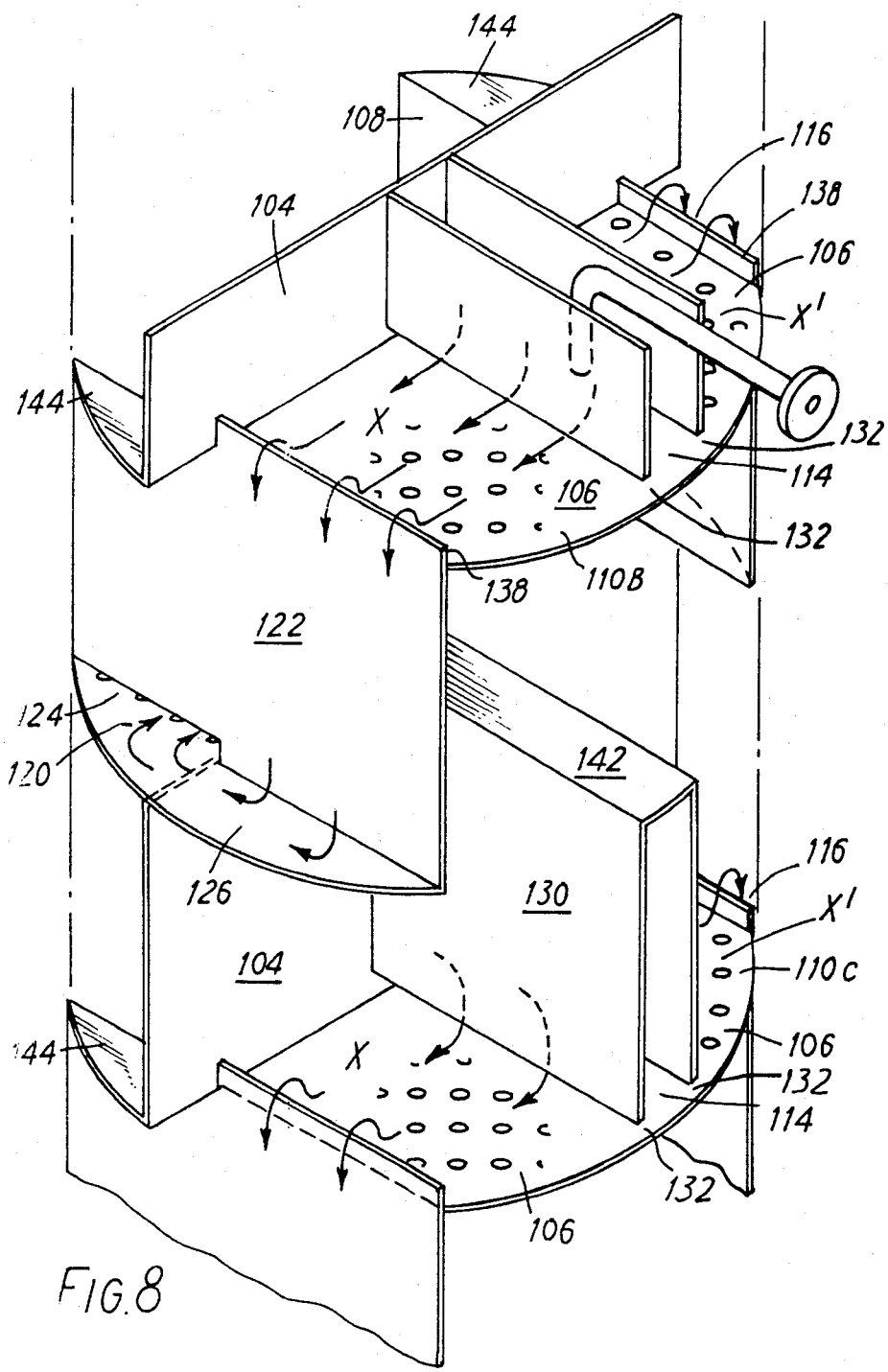
FIG. 8 is a diametrically opposed view of the construction illustrated in FIG. 5.

To permit liquid draining from outlet area 116 to pass from zone 106 to zone 108, the portion of the main dividing plate extending between each chordal plate 122 and the column wall 102 and for the vertical distance extending downwards from a half tray 110 to the next half tray 112 there below is omitted (see FIGS. 7 and 8).

Thus, liquid flowing into outlet area 116 is caught on plate 126 and flows over base plate 120 and through slit inlet 124 on to a section Y or Y' of a half tray 112 across which it flows to outlet area or downcomer opening 118.

To direct liquid from each outlet area 118 from a half tray 112 in zone 108 to a central portion of the next half tray 110 below in the zone 106, a second pair of chordal plates 130 are provided which extend vertically between the other pairs of adjacent trays, e.g. 112B and 110C as shown, the plates extending across the full chordal width of the column, i.e. extending from both sides of main column dividing plate 104, and in the planes of the two opposed edges of the area 118. At the level of the lower half tray, i.e. a half tray 110 in zone 106, a horizontal slit 132 is formed at the bottom of each plate on the other side of the main column dividing plate from the outlet 118, to provide inlets to each section of a half tray 110, and the space between the plates 130 on the other side of main column dividing plate 104 at the level of half tray 110 is sealed by horizontal plate 134. To permit liquid draining through outlet area 118 to pass from zone 108 back to zone 106, the portion of the main dividing plate extending between the chordal plates 130 and for the vertical distance extending downwards from half tray 112 to the half tray 110 next below, is omitted.

Thus, liquid flowing from a plate 112 through outlet area 118 is caught on plate 134 and flows over base plate 114 and through slit inlets 132 on to the sections X, X' of a half tray 110 across which it flows to exits or drains 116.

The outlet areas 116, 118 are provided with weirs 138, 140 whose height is such as to ensure that the slit inlets 132 and 124 are sealed by a head of liquid during distillation.

The gap between the top edges of the chordal plates 130 on the other side of main column dividing plate 104 from outlet areas 118 is sealed with a head plate 142 to prevent ingress of vapour travelling up through zone 106 and likewise the gaps between the top edges of chordal plates 122 and the wall 102 of the column on the other side of the main column dividing plate 104 from outlet areas 116 are sealed with head plates 144 to prevent ingress of vapour travelling up through zone 108.

To the same general benefits as are obtained by the embodiment of FIGS. 4 to 6, the embodiment of FIGS. 7 to 10 adds the advantages that the effective weir or outlet width for each half tray is the sum of the widths of weirs 138 or 140, respectively, and is therefore substantially greater, thereby enabling the handling of higher liquid/vapour ratios.

Figure 11:
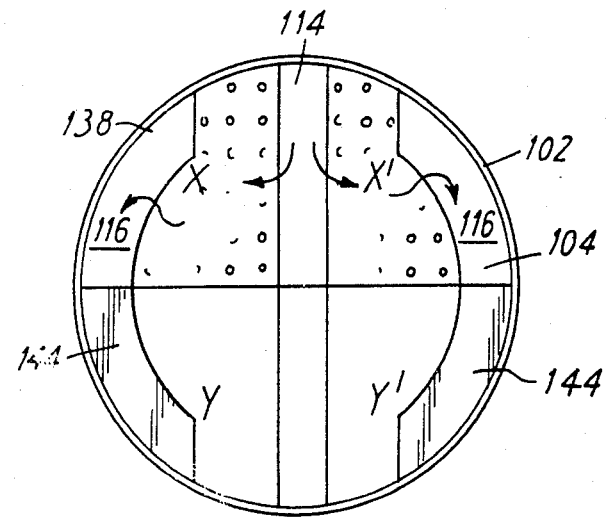
FIGS. 11 and 12 illustrate modifications of the embodiment of FIGS. 7 to 10 to increase the effective weir or outlet width of each half tray and correspond to the cross-section shown in FIG. 9.
Figure 12:
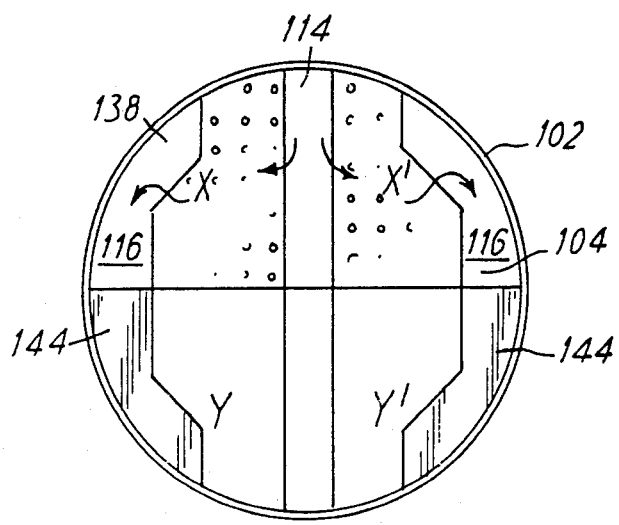

If desired, the effective widths of outlet weirs 138 may be increased by making them curved, e.g. to follow the curvature of the column wall, as illustrated in FIG. 11, or angled, e.g. cranked as illustrated in FIG. 12. FIGS. 11 and 12 are cross-sections taken at the same level as FIG. 9.

FIGS. 13 and 14 are simplified diagrammatic cross-sectional plan views at two levels of a mass transfer apparatus having an arrangement corresponding to that of FIGS. 7 to 10 but wherein each stage has four active areas.

FIG. 13 is a plan view at a level corresponding to that of FIG. 9 and FIG. 14 is a plan view at a level corresponding to that of FIG. 10.

As illustrated in FIG. 11, in one zone the active areas 202, 204, 206, 208 of the half tray are supplied with liquid from inlet areas 210 and 212 and drain into downcomers from outlet areas 214, 216 and 218. In the other zone (as illustrated in FIG. 14) the active areas 202', 204', 206' and 208' are supplied from inlet areas 214', 216' and 218' which receive liquid from the downcomers fed from outlet areas 214, 216 and 218 of the next higher stage in the other zone, and drain into downcomers from outlet areas 210' and 212' which feed inlet areas 210 and 212 of the next lower stage in the other zone. 220 and 220' are head plates corresponding in function to the plates 142 and 144 in the arrangement of FIGS. 7 to 10.

The arrangements illustrated in FIGS. 7 to 10, and FIGS. 11 and 12 are more complicated than that of FIGS. 4 to 6 but have the advantage of being able to cope with substantially higher liquid loads because of their greater overall weir or outlet width per half tray.

FIGS. 15 and 16 are simplified diagrammatic cross-sectional plan views at the same levels as those of FIGS. 13 and 14, of a similar arrangement to that illustrated in FIGS. 13 and 14 but wherein each stage has three active areas. In one zone, as illustrated in FIG. 15, the active areas 302, 304, 306 of each half tray are supplied with liquid from inlet areas 310, 314 and drain into downcomers from outlet areas 308, 312. In the other zone, as illustrated in FIG. 16, the active areas 302', 304', 306' are supplied with liquid from inlet areas 308', 312' and drain into downcomers from outlet areas 310', 314'. 320 and 320' are head plates corresponding in function to the plates 142 and 144 in the arrangement of FIGS. 7 to 10.

It will be understood that for optimum performance of mass transfer columns constructed in accordance with the invention, the effective areas of the liquid/vapour contacting stages in each zone should usually be essentially the same. However in a few cases this will not be so. For example where the liquid feed to the column is initially fed to one zone only and is heavily subcooled, a reduction of the vapour load in that zone relative to the other zone will occur above the feedpoint and it may be desirable to compensate for this by reducing the active areas of that zone relative to the other. Similarly, the axial distance between adjacent trays should also be the same in corresponding parts in all of the zones. Likewise, the spacing between axially adjacent liquid/vapour contacting stages in any section of the column as a whole should be uniform; in other words, the spacing should be x/2 where x is the axial spacing between adjacent stages in either of the zones. However, the spacing between adjacent stages in one section of the column may differ from that in another section of the column.

It is an important feature of the invention that the parallel axially extending liquid/vapour contacting zones are constructed and arranged such that the upward vapour flows in each are kept essentially separate. However, in order to ensure pressure equalisation between the zones, it may be desirable to provide for very limited transfer of vapour between zones at selected points up the column, e.g. by connecting the zones with small diameter pressure balance pipes through downcomers or by other means.

The whole or less than the whole of the section of a mass-transfer column having vapour/liquid contacting stages may be constructed in accordance with the invention. For example, for some distillation applications it may be desirable that only that portion above the feed point is so constructed, with the portion below the feed point being of a different construction, e.g. the form illustrated in FIG. 1.

Whereas in the drawings the means of preventing vapour passing from one zone to another comprise outlet weirs whose height ensures that the inlets to the trays are sealed with a head of liquid, it will be understood that alternative means may be used, such as by providing inlet weirs, in which case the outlet weirs may be omitted.

The invention is now further illustrated by the following Examples.

EXAMPLE 1

This example compares the fractionation achieved within an absorber of conventional design and having four trays or stages operating at 100% efficiency, with that achieved by using an absorber having the arrangement illustrated in FIGS. 5 and 6 of the drawings, i.e. in which in effect each of the 4 trays has been split into two whereby each of the two zones of the column has 4 stages each comprising a half tray, the spacings between adjacent trays in each of the zones being the same as the spacing between the adjacent trays in the conventional column. The same feed components and the same operational efficiency are employed in each column. In each case, the feed to the top tray was a liquid containing 99 moles per hour of pentane and 1 mole per hour hexane and the feed below the bottom tray was a vapour containing 50 moles per hour pentane and 50 moles per hour hexane. In both cases, the top feed was maintained at its bubble point temperature and the lower vapour feed was maintained at its dew point, to ensure a valid comparison of results, and the pressure in each case was maintained at 30 psia.

The resultant top and bottom products recovered from the absorbers are compared in the table below, while the improvement in fractionation is assessed in the form of a fractionation performance index. Fractionation performance index is defined as moles per hour pentane (LK) in overhead divided by moles per hour pentane (LK) in base multiplied by moles per hour hexane in base (HK) divided by moles per hour hexane (HK) in overhead:

| | Conventional absorber | | | | |
| --- | --- | --- | --- | --- | --- |
| | Top Feed | Lower Feed | Top Product | Bottom Product | Fractionation Performance Index |
| Moles per hour $C_5$ | 99.0 | 50.0 | 106.67 | 42.33 | 47.88 |
| Moles per hour $C_6$ | 1.0 | 50.0 | 2.55 | 48.45 | |

| | Absorber of FIGS. 5 and 6 | | | | |
| --- | --- | --- | --- | --- | --- |
| | Top Feed | Lower Feed | Top Product | Bottom Product | Fractionation Performance Index |
| Moles per hour $C_5$ | 99.0 | 50.0 | 108.01 | 40.99 | 94.74 |
| Moles per hour $C_6$ | 1.0 | 50.0 | 1.38 | 49.62 | |

It can easily be seen that modifying the absorber in accordance with the invention has almost doubled the index of fractionation performance.

Moreover, enhanced operational efficiency is obtained from the second absorber due to the path followed by the descending liquid, the longer path length of the liquid over each tray and the altered liquid to vapour mass ratio, compared to the conventional system.

EXAMPLES 2 TO 4

(Examples 2 and 4 are for the purposes of comparison)

In Examples 2 and 3 the fractionation achieved in a distillation column of conventional design comprising three trays above the feed and three trays below the feed (Example 2) is compared with the fractionation achieved in a column having the arrangement illustrated in FIGS. 7 to 10 having 3 half trays in each of the two zones above the feed and the same number in each of the two zones below the feed (Example 3) and wherein in each zone the spacing between adjacent half trays is the same as between adjacent trays in the conventional column.

In each case 100% operation efficiency is taken for the trays.

In both cases the feed was 100 moles per hour pentane and 100 moles per hour hexane and the reflux ratio was maintained at 2.0. Reflux ratio is defined as ratio of mass flow of reflux returned to the top tray divided by the mass flow of distillate liquid product removed. Total condensation of tower overhead vapour was taken in both cases. The feed and reflux temperatures were maintained at their bubble points throughout both Examples, and the pressure of operation similarly maintained at 30 psia for both Examples, to ensure a valid comparison of results. The results are shown in the Table below. It will be seen that the present invention provides an improvement in fractionation performance of 223%. Moreover enhanced operational efficiency is obtained in the process of Example 3 as compared with Example 2, due to the path followed by the descending liquid, and the altered liquid to vapour mass ratios.

In Example 4, the distillation of Example 2 was repeated but with the reflux ratio raised to the level required to obtain the same fractionation performance index as that achieved in Example 3. The results are again shown in the Table from which it can be seen that an increase in energy consumption of about $1.9 \times 10^6 \times BTU$ per hour is required; an increase of over 60%.

TABLE

| Example | | Feed (moles/hr) | Reflux Ratio | Top Product (moles/hr) | Base Product (moles/hr) | Reboiler Duty (mmbtu/hr) | Fractionation Performance Index (calculated as per Example 1) |
| --- | --- | --- | --- | --- | --- | --- | --- |
| 2 | $C_5$ | 100.0 | 2.00 | 89.272 | 10.728 | 3.08 | 66.01 |
| | $C_6$ | 100.0 | | 11.195 | 88.805 | | |
| 3 | $C_5$ | 100.0 | 2.00 | 92.616 | 7.384 | 3.075 | 147.22 |
| | $C_6$ | 100.0 | | 7.851 | 92.149 | | |
| 4 | $C_5$ | 100.0 | 3.893 | 92.619 | 7.381 | 4.968 | 147.3 |
| | $C_6$ | 100.0 | | 7.848 | 92.152 | | |

I claim:

1. A mass transfer apparatus which includes a columnar section to extend generally vertically during use, the columnar section containing a plurality of liquid/vapour contacting stages in axially spaced relationship with a downcomer for transferring a liquid stream from each stage to the next down the section and with space for upward vapour flow between the stages, said section further containing an axially extending divider which divides said upward vapour flow space into two parallel zones such that the vapour flow up the section will be in two parallel and separate streams, the liquid/vapour contacting stages being such that each zone has a plurality of the liquid/vapour contacting stages located at axially spaced intervals therealong with the locations of the stages in one zone being staggered axially relative to those of the stages in the other zone along the columnar section, each liquid/vapour contacting stage comprising an active liquid/vapour contact area and an inlet for the supply of liquid to the active area and outlet for the draining of liquid from the active area, each outlet being connected by a downcomer for liquid flow therethrough to an inlet of an active area of the next lower stage in the section whereby liquid flow down the section will be directed alternately from one zone to the other as it is passed successively from stage to stage down the section, the inlet and outlet of each stage being disposed on opposite sides of the active area and to the same side of the divider as the active area such that liquid flow from the inlet across the active area to the outlet will be generally rectilinear and parallel to the divider, and the location along the width of the divider of the active area of the stages in one zone corresponding with that of the corresponding active area of the stages in the other zone, and the locations of the inlet and outlet for the active area of the stages of the one zone corresponding with those of the outlet and inlet, respectively, of the corresponding active area of the stages of the other zone whereby the direction of liquid flow across the active area of each stage in the one zone will be in the opposite sense to the direction of liquid flow across the corresponding active area of each stage in the other zone.

2. An apparatus as claimed in claim 1 in which the inlet and outlet each extend across the zone in a direction generally transverse to the plane of the divider.

3. An apparatus as claimed in claim 2 in which each liquid/vapour contacting stage is divided into an inlet and an outlet area lying one on each side of an active area by notional dividing lines extending in a direction generally normal to that of the plane of the divider.

4. An apparatus as claimed in claim 1 or claim 2 in which said liquid/vapour contacting stage includes a plurality of active areas each lying between an inlet and an outlet.

5. An apparatus as claimed in claim 4 in which the liquid/vapour contacting stages are provided with a plurality of separate active areas each having disposed to one side thereof an inlet area for receiving liquid draining from an active area of the preceding stage in the section, and disposed to an opposed side thereof an outlet area for draining liquid from said active area, and wherein the locations across the width of the divider of the active areas of the stages in one zone correspond with those of the active areas in the other zone and the locations of the inlet and outlet areas of the stages in one zone correspond with those of the outlet and inlet areas, respectively, of the stages in the other zone.

6. An apparatus as claimed in claim 5 in which each stage has 2n active areas, p inlet areas and q outlet areas, where n is a positive integer and where in one of the zones $p=n$ and $q=n+1$ and in the other of the zones $p=n+1$ and $q=n$, and wherein the liquid/vapour contacting stage is divided into active areas, inlet areas and outlet areas by notional dividing lines which extend in a direction generally normal to the plane of the axially extending divider.

7. An apparatus as claimed in claim 6 in which n is 1 or 2.

8. An apparatus as claimed in claim 7 in which each liquid/vapour contacting stage has two active areas, one of the zones includes stages having an inlet area, an active area disposed to each side of said inlet area and an outlet area disposed to the other side of each active area from the inlet area, and the other of the zones includes stages having an outlet area, an active area disposed to each side of said outlet area and an inlet area disposed to the other side of each active area from the outlet area.

* * * * *

UNITED STATES PATENT AND TRADEMARK OFFICE
CERTIFICATE OF CORRECTION

PATENT NO. : 4,496,430

DATED : January 29, 1985

INVENTOR(S) : Arthur E. O. Jenkins

It is certified that error appears in the above-identified patent and that said Letters Patent is hereby corrected as shown below:

In Column 15, line 31, after the word "inlet" please insert the word --area--.

In Column 15, line 36, please delete "said" and insert therefor --each--.

Signed and Sealed this

Twentieth Day of August 1985

[SEAL]

Attest:

DONALD J. QUIGG

Attesting Officer    Acting Commissioner of Patents and Trademarks